US012092300B2

(12) United States Patent
Xie et al.

(10) Patent No.: US 12,092,300 B2
(45) Date of Patent: Sep. 17, 2024

(54) NECK HANGING LED LAMP WITH TIMER

(71) Applicant: Shenzhen Kaisiri Technology Co., LTD, Shenzhen (CN)

(72) Inventors: Shangfeng Xie, Leiyang (CN); Yihui Wu, Gaozhou (CN)

( * ) Notice: Subject to any disclaimer, the term of this patent is extended or adjusted under 35 U.S.C. 154(b) by 0 days.

(21) Appl. No.: 18/383,563

(22) Filed: Oct. 25, 2023

(65) Prior Publication Data

US 2024/0052998 A1 Feb. 15, 2024

(30) Foreign Application Priority Data

Jul. 28, 2023 (CN) ......................... 202322006953.6

(51) Int. Cl.

| | |
|---|---|
| ***F21V 23/00*** | (2015.01) |
| ***F21L 4/00*** | (2006.01) |
| ***F21V 21/084*** | (2006.01) |
| ***F21V 23/04*** | (2006.01) |
| *F21Y 115/10* | (2016.01) |

(52) U.S. Cl.

CPC .............. *F21V 23/003* (2013.01); *F21L 4/00* (2013.01); *F21V 21/084* (2013.01); *F21V 23/001* (2013.01); *F21V 23/04* (2013.01); *F21Y 2115/10* (2016.08)

(58) Field of Classification Search

CPC .... F21V 23/003; F21V 21/084; F21V 23/001; F21V 23/04; F21V 33/0004; F21V 33/00; F21V 21/14; F21V 21/32; F21V 21/145; F21V 23/00; F21V 23/0414; F21L 4/00; F21L 4/04; F21Y 2115/10; F21S 9/02

See application file for complete search history.

(56) References Cited

U.S. PATENT DOCUMENTS

| | | | | |
|---|---|---|---|---|
| 5,268,826 A * | 12/1993 | Greene | F21V 23/04 | 362/802 |
| 2006/0176680 A1* | 8/2006 | Bretz | F21V 21/32 | 362/108 |
| 2007/0115652 A1* | 5/2007 | Simoni | F21V 21/30 | 362/103 |
| 2017/0138585 A1* | 5/2017 | Korenek | F21V 23/04 | |
| 2020/0109841 A1* | 4/2020 | Cacciabeve | F21L 4/04 | |
| 2021/0148518 A1 | 5/2021 | Ren et al. | | |
| 2022/0146056 A1 | 5/2022 | Janik et al. | | |
| 2023/0051044 A1* | 2/2023 | Hu | F21V 21/22 | |
| 2023/0184394 A1 | 6/2023 | Kawabata | | |

* cited by examiner

*Primary Examiner* — Bao Q Truong

(74) *Attorney, Agent, or Firm* — Shen Huang

(57) ABSTRACT

The present disclosure discloses a neck hanging Light-Emitting Diode (LED) lamp with a timer. The present disclosure takes a neck hanging main body as a carrier in design, and a light source configured to light and an electronic timer configured for a user to time in seconds are respectively arranged at both ends of the neck hanging main body, so that this product can have both effects of lighting and timing, which meets conventional lighting work, and can also meet a requirement of the user for a timing function. Moreover, a sleeve that can be pushed and is provided with a lens is arranged at the light source. Under an operation of manually pushing the sleeve, a focus point of far and near light can be further changed, so as to present different lighting effects.

10 Claims, 4 Drawing Sheets

NECK HANGING LED LAMP WITH TIMER

TECHNICAL FIELD

The present disclosure relates to the technical field of lamps, and in particular, to a neck hanging Light-Emitting Diode (LED) with a timer.

BACKGROUND

As is well known, a lamp is a tool configured to light in a dark environment. Generally, the lamp needs to be held or fixed during use, which results in poor convenience. When the lamp is used in some specific scenarios, for example, running at night, cycling, or reading, both hands are unable or inconvenient to hold the lamp due to restriction at this time, which results in that normal lighting cannot be realized. Therefore, neck hanging LED lamps have emerged in the market.

At present, most of the existing neck hanging LED lamps only meet the normal lighting and are hung at the neck to achieve an effect of freeing hands. For some other functions, for example, timing, when timing is needed, external devices, for example, a mobile phone, are needed, which will bring inconvenience to a user in use. However, for night running exercises, cycling exercises, and reading exercises, a timing function is needed for assisting. Therefore, the existing neck hanging LED lamps need to be improved for this technical problem.

SUMMARY

For the disadvantages in the abovementioned conventional art, an objective of the present disclosure is to provide a neck hanging LED lamp with a timer.

To achieve the above objective, the present disclosure adopts the following technical solutions:

A neck hanging LED lamp with a timer includes a neck hanging main body that can be hung at the neck of a human body. Two ends of the neck hanging main body are respectively defined as a first functional end and a second functional end. A light source is mounted at an end of the first functional end. An electronic timer is mounted at the second functional end. A control module is mounted on the neck hanging main body. Both the light source and the electronic timer are electrically connected to the control module.

Preferably, at least part of a position where the neck hanging main body is connected to the first functional end or the second functional end can undergo plastic deformation.

Preferably, the neck hanging main body is connected to the first functional end and the second functional end through hardware hoses. Wiring channels are built in the hardware hoses. Electric connections between the light source and the control module and between the electronic timer and the control module are met by relying on the wiring channels. The outer parts of the hardware hoses are wrapped with a layer of soft adhesive.

Preferably, a sleeve is arranged at a position, directly facing a light outlet of the light source, of the first functional end in a sleeving manner. A lens is arranged at an outer pipe orifice of the sleeve. A limiting ring is arranged on the first functional end. An activity region is formed in an inner cavity of the sleeve. A diameter of the sleeve positioned in the activity region fits the limiting ring. A diameter of an inner pipe orifice of the sleeve is smaller than that of the limiting ring, so that the sleeve can be pushed repeatedly along the first functional end, but does not depart from the first functional end.

Preferably, at least one rubber ring is arranged on the limiting ring, and the rubber ring presses against an inner wall of the sleeve.

Preferably, the control module includes a main circuit board and a battery. The light source, the electronic timer, and the battery are electrically connected to the main circuit board. A charging interface is arranged on the main circuit board. A port of the charging interface is formed outside.

Preferably, an auxiliary lamp panel is arranged at a position, facing the back neck of the human body, of an outer side surface of the neck hanging main body. At least one indicator lamp is arranged on the auxiliary lamp panel. The auxiliary lamp panel is electrically connected to the main circuit board. A light guide lampshade covers the auxiliary lamp panel on the neck hanging main body.

Preferably, the electronic timer includes an electronic timer mainboard, and a display screen and an operation button arranged on the electronic timer mainboard. The electronic timer mainboard is hidden in the second functional end. The second functional end is provided with a light transmitting part for a user to view the display screen at the display screen. The operation button is arranged outside the second functional end.

Preferably, the operation button is a rotary press switch.

Preferably, a soft cushion is arranged at a position, facing the rear neck of the human body, of an inner side surface of the neck hanging main body.

Due to the adoption of the abovementioned solution, the present disclosure takes the neck hanging main body as a carrier in design, and the light source configured to light and the electronic timer configured for a user to time in seconds are respectively arranged at both ends of the neck hanging main body, so that this product has both effects of lighting and timing, which meets conventional lighting work, and can also meet a requirement of the user for a timing function. Meanwhile, the neck hanging main body is provided with a plastic deformation part. By relying on this part, a lighting direction can be changed, viewing the time displayed by the electronic timer by the user can be facilitated, and the neck hanging main body can be folded to achieve an effect of folding and storing. Moreover, the sleeve that can be pushed and is provided with the lens is arranged at the light source. Under an operation of manually pushing the sleeve, a focus point of far and near light can be further changed, so as to present different lighting effects.

DETAILED DESCRIPTION OF THE EMBODIMENTS

Figure 1:
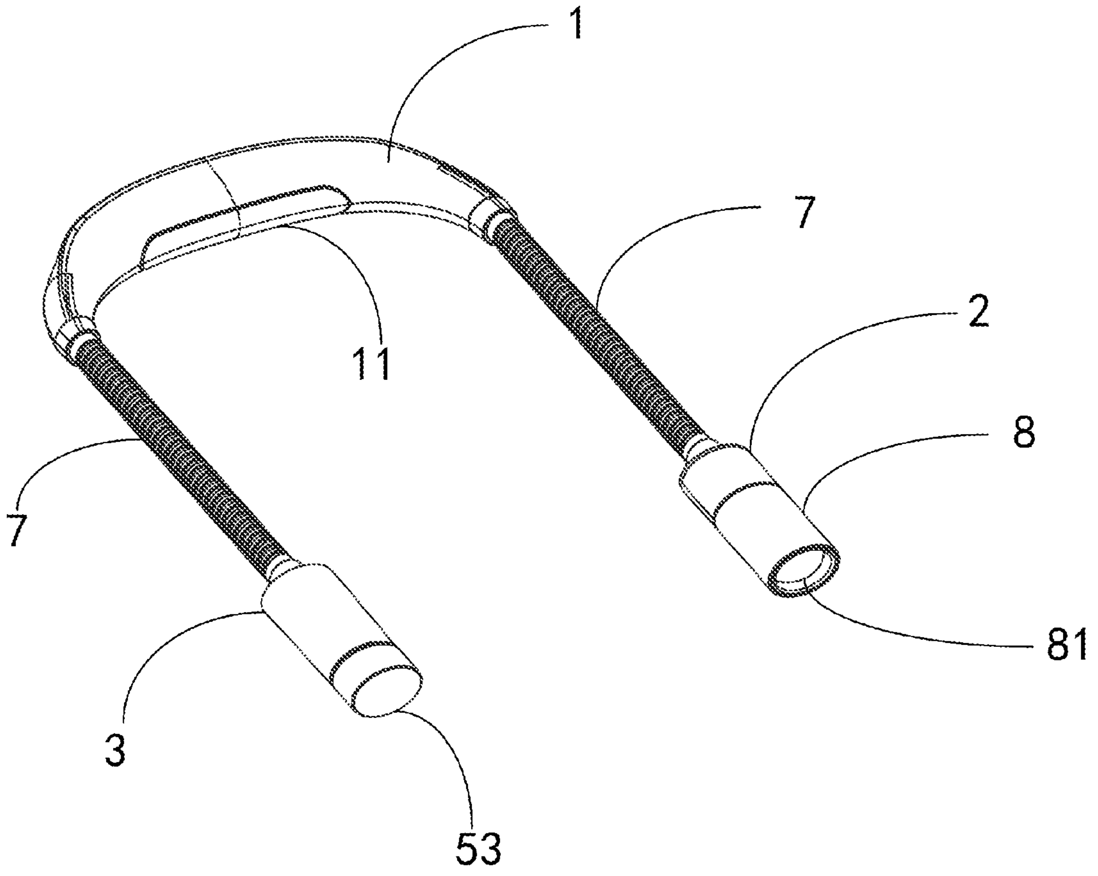
FIG. 1 is a schematic diagram of a three-dimensional structure of an embodiment of the present disclosure.

In order to make the objectives, technical solutions, and advantages of the present disclosure more comprehensible, the present disclosure is further described in detail below with reference to drawings and embodiments. It is to be understood that specific embodiments described herein are merely used for explaining the present disclosure and are not intended to limit the present disclosure.

In the description of the present disclosure, it is to be understood that orientation or position relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", and the like are the orientation or position relationships shown in the drawings, are merely for facilitating the description of the present disclosure and simplifying the description, rather than indicating or implying the referred devices or elements must have specific orientations, or be constructed and operated in specific orientations, and therefore, cannot be construed as a limitation to the present disclosure. In addition, terms "first" and "second" are merely used for description and cannot be understood as indicating or implying relative importance or implicitly indicating the number of indicated technical features. Therefore, a feature limited with "first" or "second" may explicitly or implicitly include one or more features. In the description of the present disclosure, "a plurality of" means two or more, unless otherwise limited explicitly and specifically.

In the description of the present disclosure, it is to be noted that, unless otherwise specified and defined explicitly, terms "mount", "mutually connect", "connect", "fix" and the like are to be broadly understood. For example, the terms may refer to fixed connection and may also refer to detachable connection or integrated connection. The terms may refer to mechanical connection and may also refer to electrical connection. The terms may refer to direct connection, may also refer to indirect connection through a medium, and may refer to communication in two elements or an interaction relationship of the two elements. Those of ordinary skill in the art may understand specific meanings of the above terms in the present disclosure according to specific cases.

Figure 2:
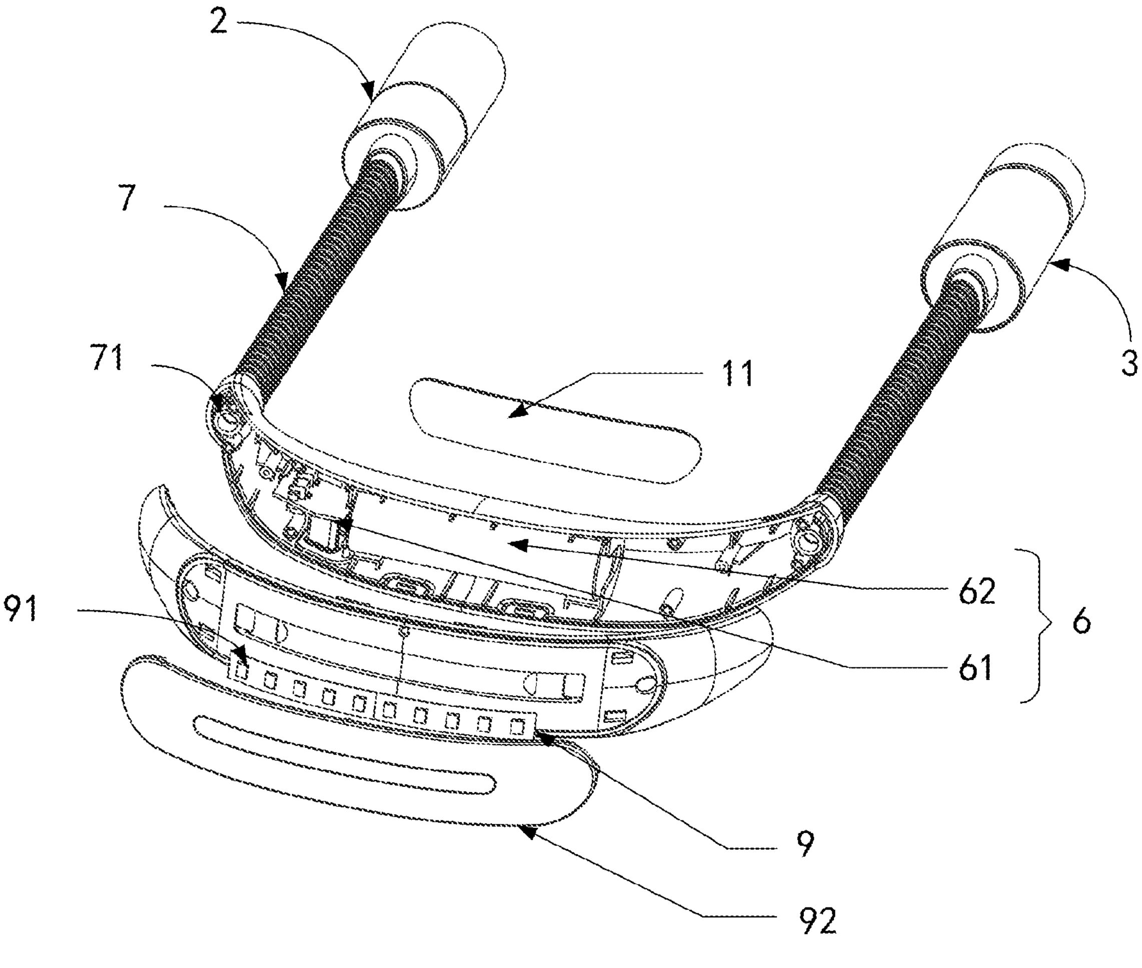
FIG. 2 is an exploded schematic diagram of a structure of an embodiment of the present disclosure.
Figure 3:
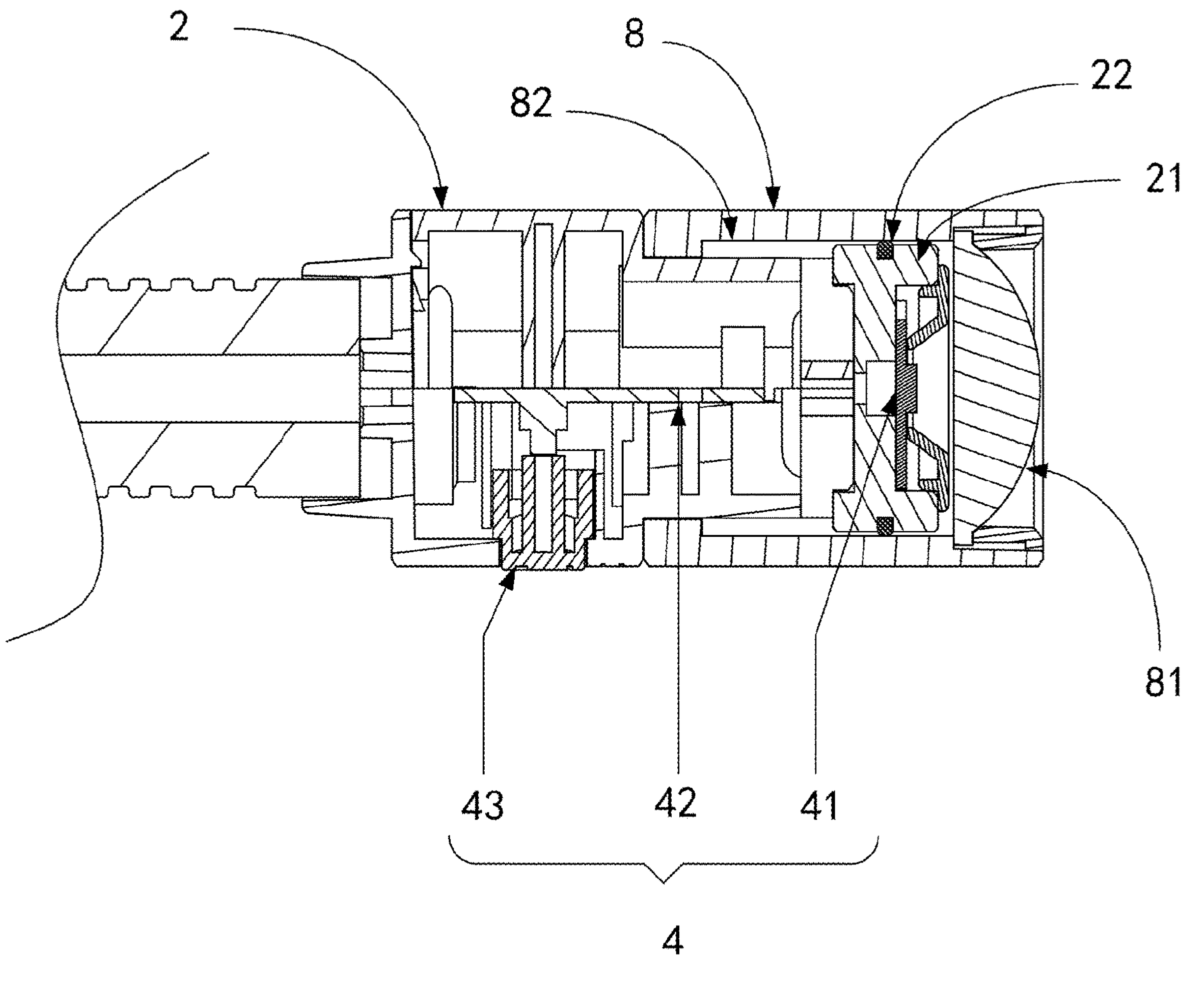
FIG. 3 is a schematic structural diagram of a first functional end of an embodiment of the present disclosure.
Figure 4:
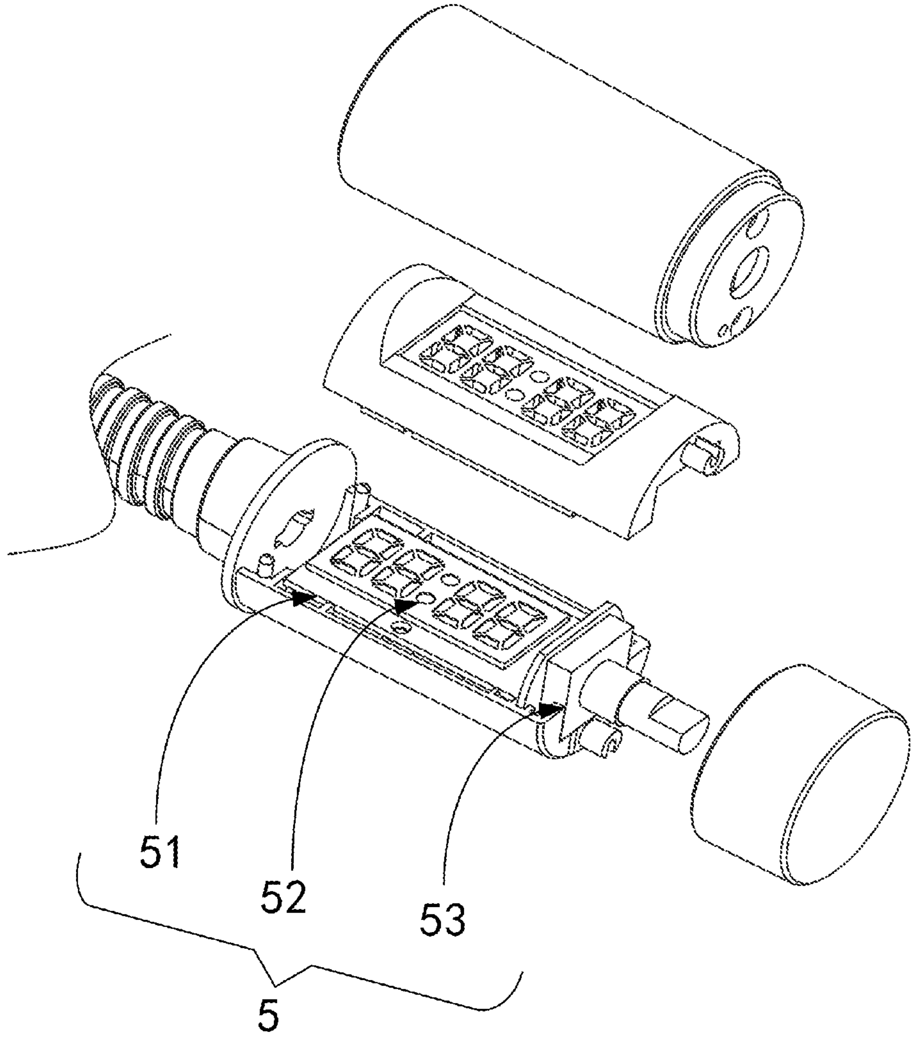
FIG. 4 is a schematic structural diagram of a second functional end of an embodiment of the present disclosure.

As shown in FIG. 1 to FIG. 4, the present embodiment provides a neck hanging LED lamp with a timer, including a neck hanging main body 1. The profile of the neck hanging main body 1 is designed to fit the hanging at the neck of a human body. Two ends of the neck hanging main body 1 are respectively defined as a first functional end 2 and a second functional end 3. A light source 4 is mounted at an end of the first functional end 2. An electronic timer 5 is mounted at the second functional end 3. A control module 6 is mounted on the neck hanging main body 1. Both the light source 4 and the electronic timer 5 are electrically connected to the control module 6. It is to be noted that the light source 4 of the present embodiment may specifically use an LED lamp bead 41 and a secondary circuit board 42. A switch button 43 is arranged on the first functional end for a user to control the on and off of the light source 4 and a button for adjusting light brightness (specifically, gears may be adjusted through the number of pressing: a first gear: strong light; a second gear: medium light; a third gear: weak light; a fourth gear: sharp flash; and a fifth gear: slow flash; and an off state can be entered by a long press of any gear). The electronic timer 5 is a commonly available electronic timer on the market.

Therefore, the present embodiment takes the neck hanging main body 1 as a carrier in design, and the light source 4 configured to light and the electronic timer 5 configured for the user to time in seconds are respectively arranged at two ends of the neck hanging main body 1, so that this product has both effects of lighting and timing, which meets conventional lighting work, and can also meet a requirement of the user for a timing function.

Further, at least part of a position where the neck hanging main body 1 of the present embodiment is connected to the first functional end 2 or the second functional end 3 can undergo plastic deformation. Under the action of an external force, by relying on this part, a lighting direction can be changed, viewing the time displayed by the electronic timer 5 by the user can be facilitated, and the neck hanging main body 1 can be folded to achieve an effect of folding and storing. For a structure for realizing plastic deformation of this part, the neck hanging main body 1 of the present embodiment is connected to the first functional end 2 and the second functional end 3 through hardware hoses 7. The plastic deformation is met by relying on the hardware hoses 7, and wiring channels 71 are built in the hardware hoses 7 to meet a wiring requirement between the control module 6 and the light source 4 and between the control module 6 and the electronic timer 5. In addition, for a more comfortable skin contact of the user, the outer parts of the hardware hoses 7 are wrapped with a layer of soft adhesive, specifically, silicone.

Further, in the design of the light source 4 of the present embodiment, in order to achieve different illumination light effects, for example, near and far light switching, that is, light focusing adjustment, a sleeve 8 is arranged at a position, directly facing a light outlet of the light source 4, of the first functional end 2 of the present embodiment in a sleeving manner. A lens 81 is arranged at an outer pipe orifice of the sleeve 8. The lens 81 may use a convex lens. A limiting ring 21 is arranged on the first functional end 2. An activity region 82 is formed in an inner cavity of the sleeve 8. A diameter of the sleeve 8 positioned in the activity region 82 fits the limiting ring 21. A diameter of an inner pipe orifice of the sleeve 8 is smaller than that of the limiting ring 21, so that the sleeve 8 can be pushed repeatedly along the first functional end 2, but does not depart from the first functional end 2. Thus, the sleeve 8 may be manually pushed to change the position of the lens 81 to change a focus point of light, thereby achieving different light illumination effects, that is, switching far and near light.

Further, in order to achieve a damping effect in a process of pushing the sleeve 8, so that the sleeve 8 cannot retract or extend automatically, and the sleeve can be maintained at the position after being pushed, so at least one rubber ring 22 is arranged on the limiting ring 21 of the present embodiment, and the rubber ring 22 presses against an inner wall of the sleeve 8. Therefore, frictional resistance for preventing the sleeve 8 from automatically moving is provided by the pressing of the rubber ring 22.

Further, for the setting of the control module 6, the control module 6 of the present embodiment includes a main circuit board 61 and a battery 62. The light source 4, the electronic timer 5, and the battery 62 are electrically connected to the main circuit board 61. A charging interface is arranged on the main circuit board 61. A port of the charging interface is formed outside. Thus, electric energy required for overall work is provided by relying on the battery 62, and the electric energy is transmitted after being converted by the main circuit board 61 to meet the overall orderly work.

Further, in order to improve the appearance effect of the product, an auxiliary lamp panel 9 is arranged at a position, facing the back neck of the human body, of an outer side surface of the neck hanging main body 1 of the present embodiment. At least one indicator lamp 91 is arranged on the auxiliary lamp panel 9. The auxiliary lamp panel 9 is electrically connected to the main circuit board 61. A light guide lampshade 92 covers the auxiliary lamp panel 9 on the neck hanging main body 1. The auxiliary lamp panel 9 may achieve a decorative effect, or a charging indicating effect, or a battery electric quantity remaining reminding effect, or the like. These effects are all defined by internal program logic programming, which are only described as examples and will not be elaborated excessively.

Further, the electronic timer 5 of the present embodiment is a conventional electronic timer on the market in terms of functional implementation, but in terms of mechanism installation, the electronic timer 5 of the present embodiment is defined as an electronic timer mainboard 51, and a display screen 52 and an operation button 53 arranged on the electronic timer mainboard 51. The electronic timer mainboard 51 is hidden in the second functional end 3. The second functional end 3 is provided with a light transmitting part for a user to view the display screen 52 at the display screen 52. The operation button 53 is arranged outside the second functional end 3. Moreover, in order to facilitate an operation of the user, the operation button 53 of the present embodiment is a rotary press switch.

Further, in order to improve the comfort of wearing again, a soft cushion 11 is arranged at a position, facing the rear neck of the human body, of an inner side surface of the neck hanging main body 1 of the present embodiment.

The above is merely preferred embodiments of the present disclosure and does not limit the patent scope of the present disclosure. All equivalent structure or equivalent flowchart transformations made by using the contents of the specification and the drawings of the present disclosure, or direct or indirect application in other relevant technical fields are similarly included in the patent scope of protection of the present disclosure.

What is claimed is:

1. A neck hanging Light-Emitting Diode (LED) lamp with a timer, comprising a neck hanging main body that can be hung at the neck of a human body, wherein two ends of the neck hanging main body are respectively defined as a first functional end and a second functional end; a light source is mounted at an end of the first functional end; an electronic timer is mounted at the second functional end; a control module is mounted on the neck hanging main body; and both the light source and the electronic timer are electrically connected to the control module.

2. The neck hanging LED lamp with a timer according to claim 1, wherein at least part of a position where the neck hanging main body is connected to the first functional end or the second functional end can undergo plastic deformation.

3. The neck hanging LED lamp with a timer according to claim 2, wherein the neck hanging main body is connected to the first functional end and the second functional end through hardware hoses; wiring channels are built in the hardware hoses; electric connections between the light source and the control module and between the electronic timer and the control module are met by relying on the wiring channels; and the outer parts of the hardware hoses are wrapped with a layer of soft adhesive.

4. The neck hanging LED lamp with a timer according to claim 1, wherein a sleeve is arranged at a position, directly facing a light outlet of the light source, of the first functional end in a sleeving manner; a lens is arranged at an outer pipe orifice of the sleeve; a limiting ring is arranged on the first functional end; an activity region is formed in an inner cavity of the sleeve; a diameter of the sleeve positioned in the activity region fits the limiting ring; and a diameter of an inner pipe orifice of the sleeve is smaller than that of the limiting ring, so that the sleeve can be pushed repeatedly along the first functional end, but does not depart from the first functional end.

5. The neck hanging LED lamp with a timer according to claim 4, wherein at least one rubber ring is arranged on the limiting ring, and the rubber ring presses against an inner wall of the sleeve.

6. The neck hanging LED lamp with a timer according to claim 1, wherein the control module comprises a main circuit board and a battery; the light source, the electronic timer, and the battery are electrically connected to the main circuit board; a charging interface is arranged on the main circuit board; and a port of the charging interface is formed outside.

7. The neck hanging LED lamp with a timer according to claim 1, wherein an auxiliary lamp panel is arranged at a position, facing the back neck of the human body, of an outer side surface of the neck hanging main body; at least one indicator lamp is arranged on the auxiliary lamp panel; the auxiliary lamp panel is electrically connected to the main circuit board; and a light guide lampshade covers the auxiliary lamp panel on the neck hanging main body.

8. The neck hanging LED lamp with a timer according to claim 1, wherein the electronic timer comprises an electronic timer mainboard, and a display screen and an operation button arranged on the electronic timer mainboard; the electronic timer mainboard is hidden in the second functional end; the second functional end is provided with a light transmitting part for a user to view the display screen at the display screen; and the operation button is arranged outside the second functional end.

9. The neck hanging LED lamp with a timer according to claim 8, wherein the operation button is a rotary press switch.

10. The neck hanging LED lamp with a timer according to claim 1, wherein a soft cushion is arranged at a position, facing the rear neck of the human body, of an inner side surface of the neck hanging main body.

* * * * *